US005339517A

United States Patent [19]

Diemer

[11] Patent Number: 5,339,517

[45] Date of Patent: Aug. 23, 1994

[54] PLANT TAGGING APPARATUS

[75] Inventor: Gordon J. Diemer, Grand Ledge, Mich.

[73] Assignee: The John Henry Company, Lansing, Mich.

[21] Appl. No.: 46,031

[22] Filed: Apr. 12, 1993

[51] Int. Cl.[5] .......... B23Q 7/10; B31B 1/68

[52] U.S. Cl. .......... 29/809; 29/432.2; 227/69; 227/45; 227/28

[58] Field of Search .......... 29/809, 293.56, 432.2, 29/811.2; 227/21, 28, 45, 76, 24, 67, 20, 69; 156/Dig. 23

[56] References Cited

U.S. PATENT DOCUMENTS

| | | | |
|---|---|---|---|
| 1,256,553 | 4/1917 | Grings | 227/20 |
| 1,628,848 | 5/1927 | Kingman | 227/83 |
| 2,536,573 | 1/1951 | Schafroth | 227/25 |
| 2,582,731 | 1/1952 | Young | 227/25 |
| 2,996,720 | 8/1961 | Machechine | 227/76 |
| 3,412,895 | 11/1968 | Hilton | 29/809 X |
| 3,480,193 | 11/1969 | Ralston | 227/130 |
| 3,666,157 | 5/1972 | Kawai et al. | 227/131 |
| 3,762,621 | 10/1973 | Nishikawa | 227/76 X |
| 3,802,511 | 4/1974 | Good, Jr. | 239/270 |
| 4,211,352 | 7/1980 | Zilka | 227/130 |
| 4,215,808 | 8/1980 | Sollberger et al. | 227/146 |
| 4,572,419 | 2/1986 | Klaus et al. | 227/120 |
| 4,578,139 | 3/1986 | Stehouwer | 156/DIG. 23 |
| 4,662,551 | 5/1987 | Dudley et al. | 229/211 |
| 4,689,100 | 8/1987 | Coleman | 156/73.1 |
| 4,943,294 | 7/1990 | Knapp | 227/67 |

*Primary Examiner*—Timothy V. Eley
*Assistant Examiner*—Khan V. Nguyen
*Attorney, Agent, or Firm*—Price, Heneveld, Cooper, DeWitt & Litton

[57] ABSTRACT

A tagging apparatus for attaching tags to plants includes a frame member, a holding/clamping member operably connected to the frame member for holding a tag, and a first jaw movably mounted on the frame member. The first jaw is adapted to close against a second jaw on the frame member, with the jaws including surfaces forming an opening adapted to enclose a plant stem/branch when closed. A pneumatically driven mechanism is attached to the frame member and is adapted to grip and advance a strip of flexible material onto the surfaces so that the surfaces direct the strip of flexible material around the opening means to form a loop around the plant stem/branch. The apparatus also includes a pneumatically powered cutter and stapler mechanism attached to the frame member for cutting the strip from a roll of strip material and then for stapling the strip of flexible material in the loop around the stem/branch and to the tag to thus permanently retain the tag to the stem/branch. In the preferred form, the apparatus is a portable, hand-held unit.

26 Claims, 11 Drawing Sheets

PLANT TAGGING APPARATUS

BACKGROUND OF THE INVENTION

The present invention relates generally to an apparatus for tagging plants or the like, and in particular relates to an apparatus adapted to loop a strip around a plant branch and to secure a tag to the plant branch by use of the strip.

A variety of tags have been designed to facilitate attaching identification tags and the like to plants without damaging the plants. Many of these tags have slits cut therein, the tags being made of a resilient material so that a plant branch can be forced into the slit to retain the tag to the branch. However, if the tag is too stiff or sharp, the bark of the plant branch can be damaged during or after attaching the tag. Alternatively, if the tag is not stiff enough or is creased during installation, these slit tags will not be as securely retained on the branch as is desired. Further, the method of attaching the tag to the branch by forcing the branch into the slit can be somewhat cumbersome and not as efficient as desired. For example, the installer must reach fully into the main part of the plant to reach a branch large enough to be used, which often requires extra effort and bending by the operator.

U.S. Pat. No. 2,582,731 to Young discloses a machine in which a plant stem is placed on a tag strip and the strip is then bent around the plant stem by a mechanical finger and stapled. However, the mechanical finger is potentially subject to maintenance problems and further is necessarily exposed such that it can be a safety hazard to an operator of the machine. Further, the tag is doubled-back on itself and stapled during the machine operation, which is expensive since the doubling-back wastes tag material. The machine is also limited as to the shape and size of the tag that can be used. Still further, the machine is large and complex and, therefore likely to be expensive to purchase and operate.

Thus, an improved tagging arrangement is desired which simplifies the tagging operation and makes the tagging operation more efficient. Further, a tagging apparatus and method is desired which does not require the plant to be brought to the apparatus, but rather allows tagging to be done on-site in the field.

SUMMARY OF THE INVENTION

A tagging apparatus and method solving the aforementioned problems and providing the aforementioned desired benefits is presented hereinafter.

In one aspect, the present invention is embodied in a tagging apparatus for attaching tags to plants, the tagging apparatus including a member with surfaces defining opening means adapted to receive a plant stem or branch, and advancing means connected to the member for advancing a flexible strip of material into the opening means. The surfaces are shaped to direct a leading end of the strip around the plant stem or branch and back onto a trailing portion of the strip to thus form a loop around the plant stem or branch as the strip is advanced so that the leading end and the trailing portion are positioned proximate each other.

In yet another aspect, the above noted apparatus includes securing means such as a stapler mechanism for securing the leading end and the trailing portion of the strip together.

In another aspect, the above noted apparatus includes holding means for releasably holding a tag proximate the plant stem or branch, with the securing means also being adapted to secure the tag to both the leading end and the trailing portion of the strip.

In still another aspect, the above noted apparatus includes first and second jaws that are movable to form the opening means around the plant stem or branch.

In still another aspect, the invention is embodied in an apparatus for attaching tags to plants including a frame member, holding means operably connected to the frame member for holding a tag, loop forming means operably connected to the frame member including surfaces defining opening means adapted to receive a plant stem or branch, and advancing means for advancing a strip of flexible material onto the surfaces so that the surfaces direct the strip of flexible material around the opening means to form a loop around the plant stem or branch. The apparatus also includes securing means for securing the strip of flexible material to the tag to retain the tag to the stem.

In another aspect, the apparatus is portable and light weight, and includes a handle and a portable powering means such as a compressed air supply adapting the tagging apparatus for hand-held use.

In another aspect, the invention includes a method utilizing the above noted aspects.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
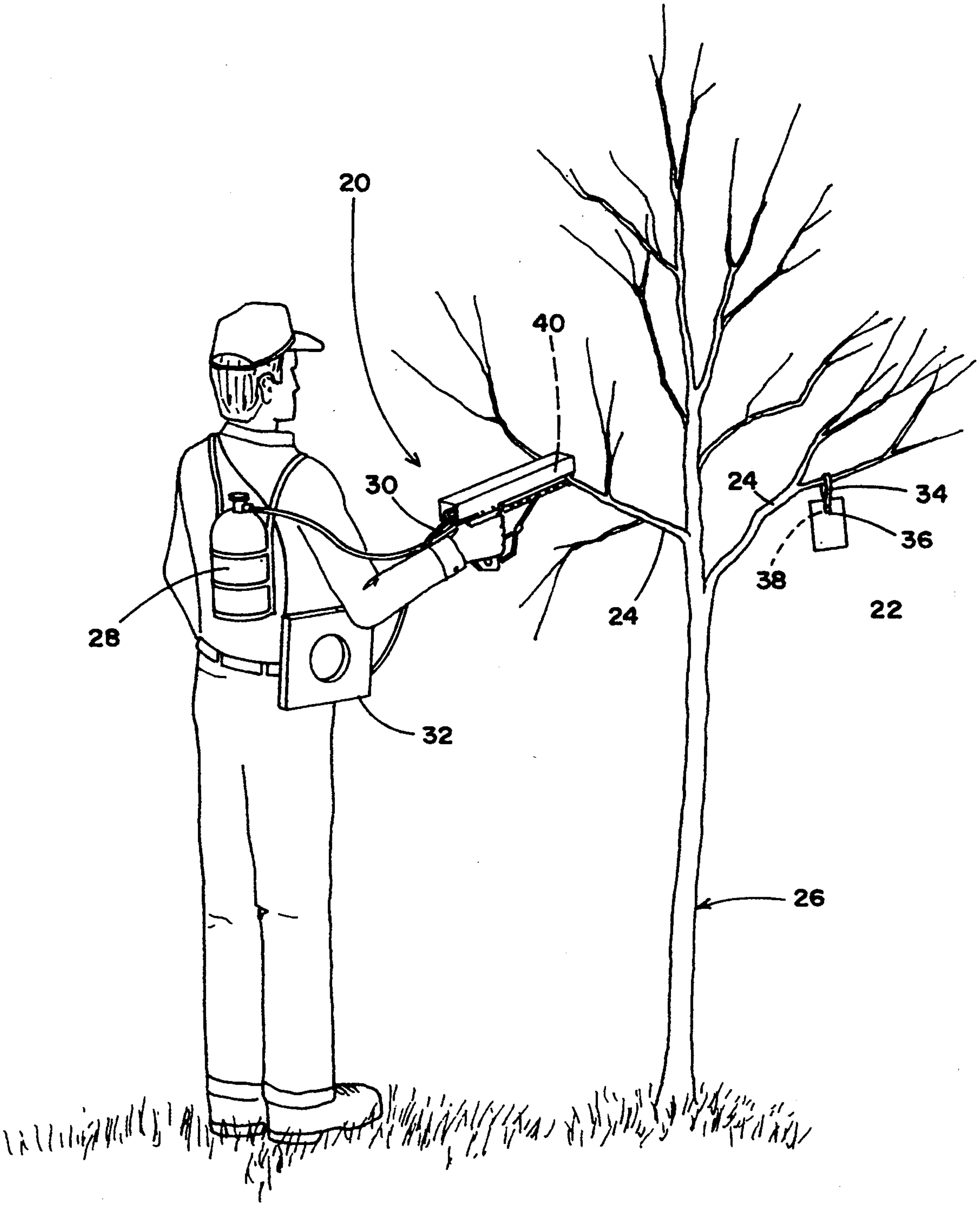
FIG. 1 is a perspective view of a plant tagging apparatus embodying the present invention as the apparatus is being used to attach a tag to a plant.

A plant tagging apparatus 20 (FIGS. 1–2) embodying the present invention is provided for attaching tags 22 to a stem or branch 24 of a plant 26. Tagging apparatus 20 is essentially a portable hand-held gun powered by a portable power source such as compressed air tank 28. Tagging apparatus 20 is uniquely adapted so that it can be positioned proximate the plant branch 24 and actuated to automatically secure identification tag 22 to the plant without injuring the plant. Specifically, apparatus 20 is actuatable to hold tag 22 while drawing a flexible strip 30 from a roll of strip material 32 located remote from apparatus 20. Strip 30 is extended around the branch 24 to form a loop 34 with the loop ends 36 and 38 positioned proximate the tag 22. Apparatus 20 is further provided with a cutting and stapling mechanism 40 to cut strip 30 from roll 32, and staple tag 22 to the ends of strip 30. Thus, by actuating tagging apparatus 20, a tag 22 is quickly, efficiently and permanently secured to plant 26 without injuring the plant.

It is contemplated that tag 22 will be a preprinted identification tag such as is commonly used to not only identify a selected plant, but also to give planting and care instructions. Preferably, tag 22 (FIGS. 2 and 3) will be made of a flexible but durable and relatively stiff material such as a UV stabilized polymeric material. Flexible strip 30 will also preferably be made from a flexible but durable polymeric material. In particular, strip 30 must have enough longitudinal stiffness to permit the strip to be advanced without folding and bunching, however strip 30 must be flexible enough to permit it to flex around branch 24 into the shape of a loop as it is being extended. For example, it is contemplated that a UV stabilized polyolefin polymer will work in this application. Notably, the present arrangement allows the strip 30 to be chosen from a less expensive material while tag 22 is chosen from a more expensive material optimally suited for printing and appearance. A staple 42 is stapled through strip ends 36 and 38 and also tag 22 to secure same together.

Figure 15:
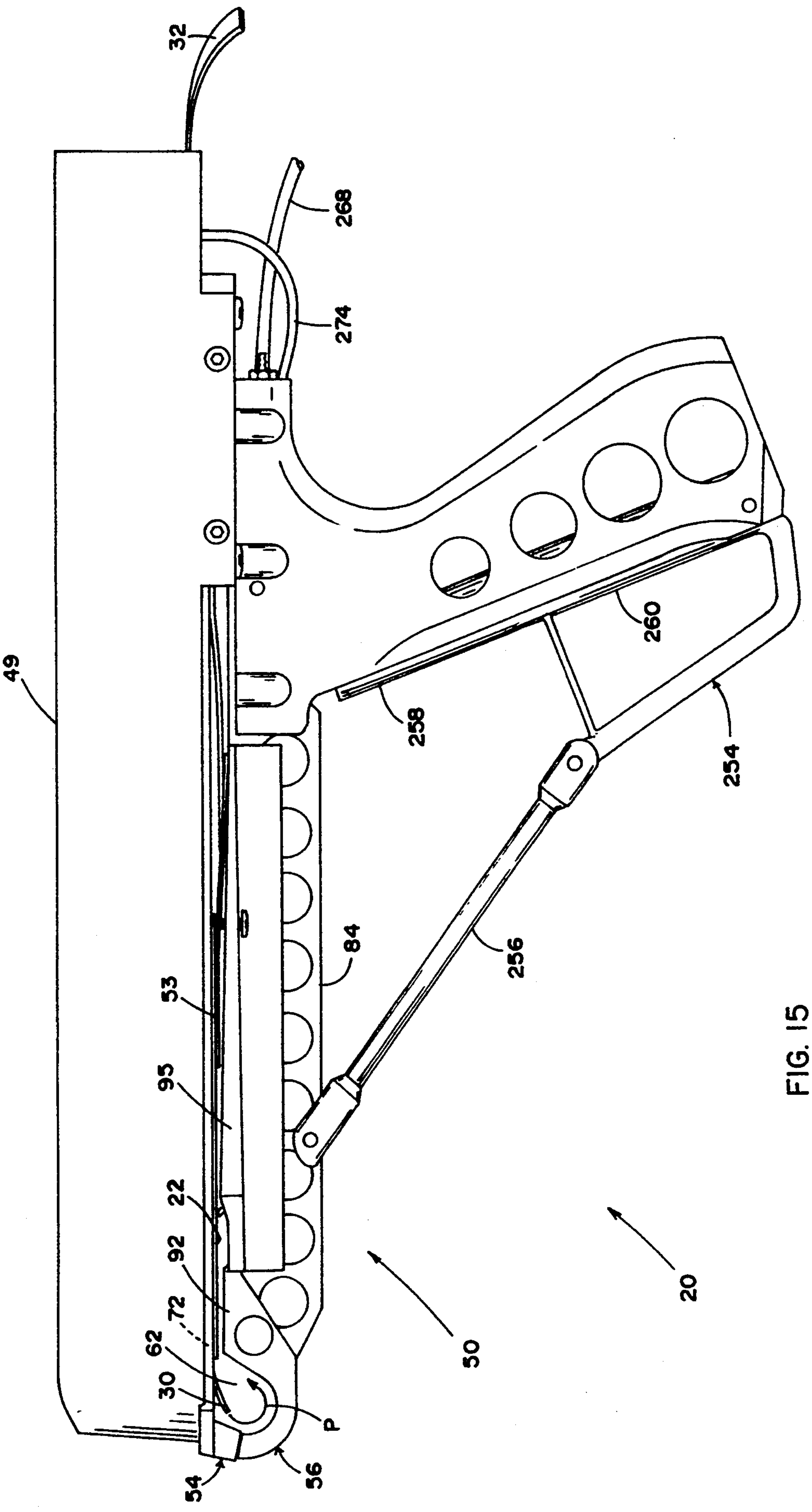
FIG. 15 is a side view of the tagging apparatus with the lower Jaw fully closed and the trigger actuated to extend the strip and staple same to the tag.

Apparatus 20 (FIGS. 4–15) includes an upper frame member 48 covered by a shield 49 and a lower holding/clamping member 50 pivotally connected to the frame member 48 at pivot 52. A leaf spring 53 is secured to lower member 50 for frictionally holding tag 22 as lower member 50 is moved toward upper member 48. The front of frame member 48 forms an upper jaw 54 and the front end of frame member 48 forms a mating lower jaw 56, with lower jaw 56 being adapted to mateably close against upper jaw 54. Jaws 54 and 56 include surfaces 58 and 60 respectively that form a teardrop-shaped opening 62 when jaws 54 and 56 are closed together (FIG. 15). Opening 62 has a predetermined size so that it can receive and enclose plant branch 24.

Upper frame member 48 (FIG. 7) includes an elongated generally planar beam 66. Beam 66 includes a front end 68 and a rear end 70, front end 68 having a hole 72 therein spaced from its extreme end 74. A strip-carrying channel 76 extends the length of beam 66 from rear end 70 to hole 72 on the top side of beam 66. A tooth-like member 78 extends downwardly from the bottom of front end 68 between extreme end 74 and hole 72. Tooth-like member 78 and front end 68 form upper jaw 54. A curvilinear channel-like surface 80 is formed in tooth-like member 78. Surface 80 aligns with channel 76 so that the leading end 36 of a strip of material 30 extended along first channel 76 and advanced through hole 72 naturally follows second channel 80. Also, a plate 82 mounts to beam 66 fully covering channel 76 adjacent hole 72 and partially covering channel 76 along the rest of channel 76. Plate 82 extends substantially the length of channel 76 helping to support strip 30 and prevent buckling as the strip is extended forwardly in channel 76.

Lower holding/clamping member 50 (FIG. 14) includes an elongated team 84 with holes 86 bored therein for reduced weight. Lower jaw 56 is formed at the front end of beam 84. A finger 88 extends forward of lower Jaw 56. The extreme end of finger 88 includes a protrusion 89 that engages a recess 91 in tooth-like member 78 to align lower jaw 56 with upper jaw 54 as jaws 54 and 56 are closed. The inner concave surface of finger 88 defines a channel 90. Channel 90 aligns with channels 76 and 80 to form a substantially continuous channel that extends around teardrop-shaped opening 62. The continuous channel is adapted to cause strip 30 to extend in a loop back onto itself as strip 30 is extended. With tag 22 held between jaws 54 and 56 by leaf spring 53 (FIG. 15), the leading end of strip 32 is advanced along path P to one side of tag 22 with the trailing end being located on the opposite side of tag 22.

Figure 2:
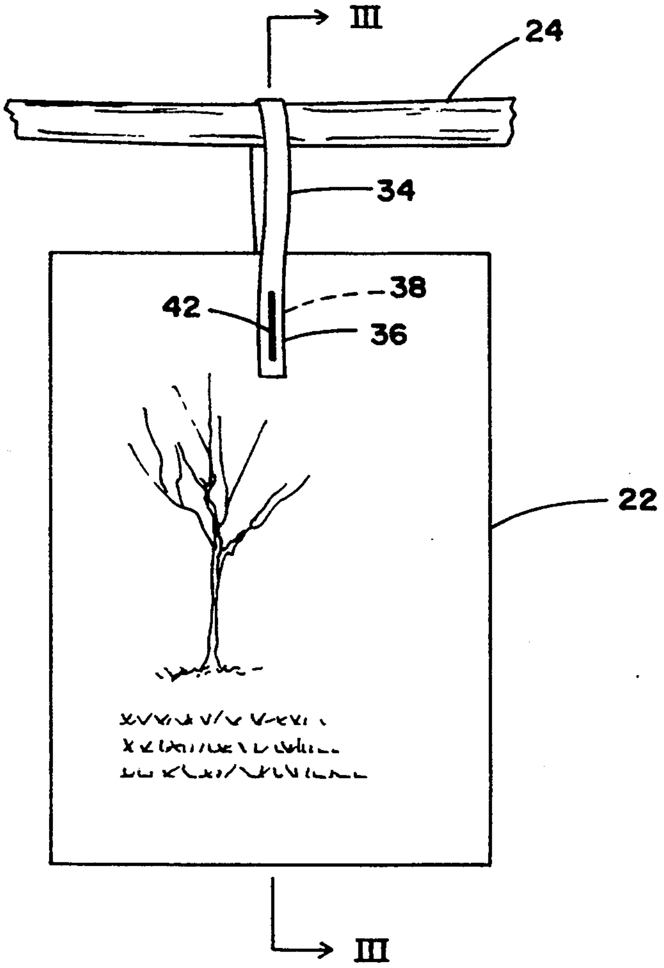
FIG. 2 is a side view of an attaching strip looped around a plant branch and stapled to a tag.
Figure 3:
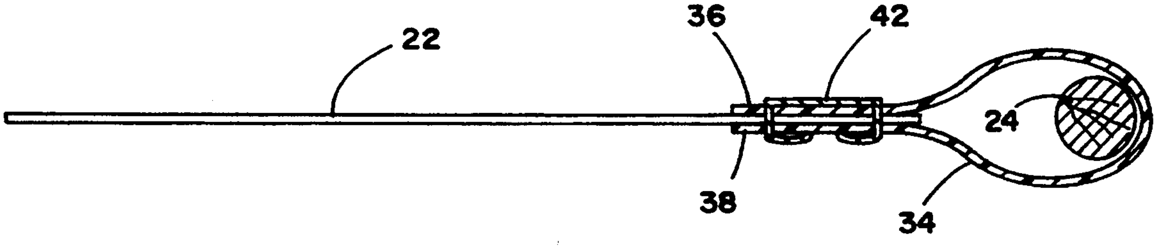
FIG. 3 is a sectional view taken along the plane III—III in FIG. 2.

An anvil 92 is positioned on lower beam 84 below upper beam hole 72 and behind teardrop-shaped hole 62. Anvil 92 includes an upper surface adapted to crimp the ends of a selected staple 42 as the staple is driven through strip ends 36 and 38 and tag 22 (FIGS. 2 and 3). Anvil 92 also extends rearwardly so that it forms a support 95 for tag 22 during the operation of tagging apparatus 20.

Figures 5, 6:
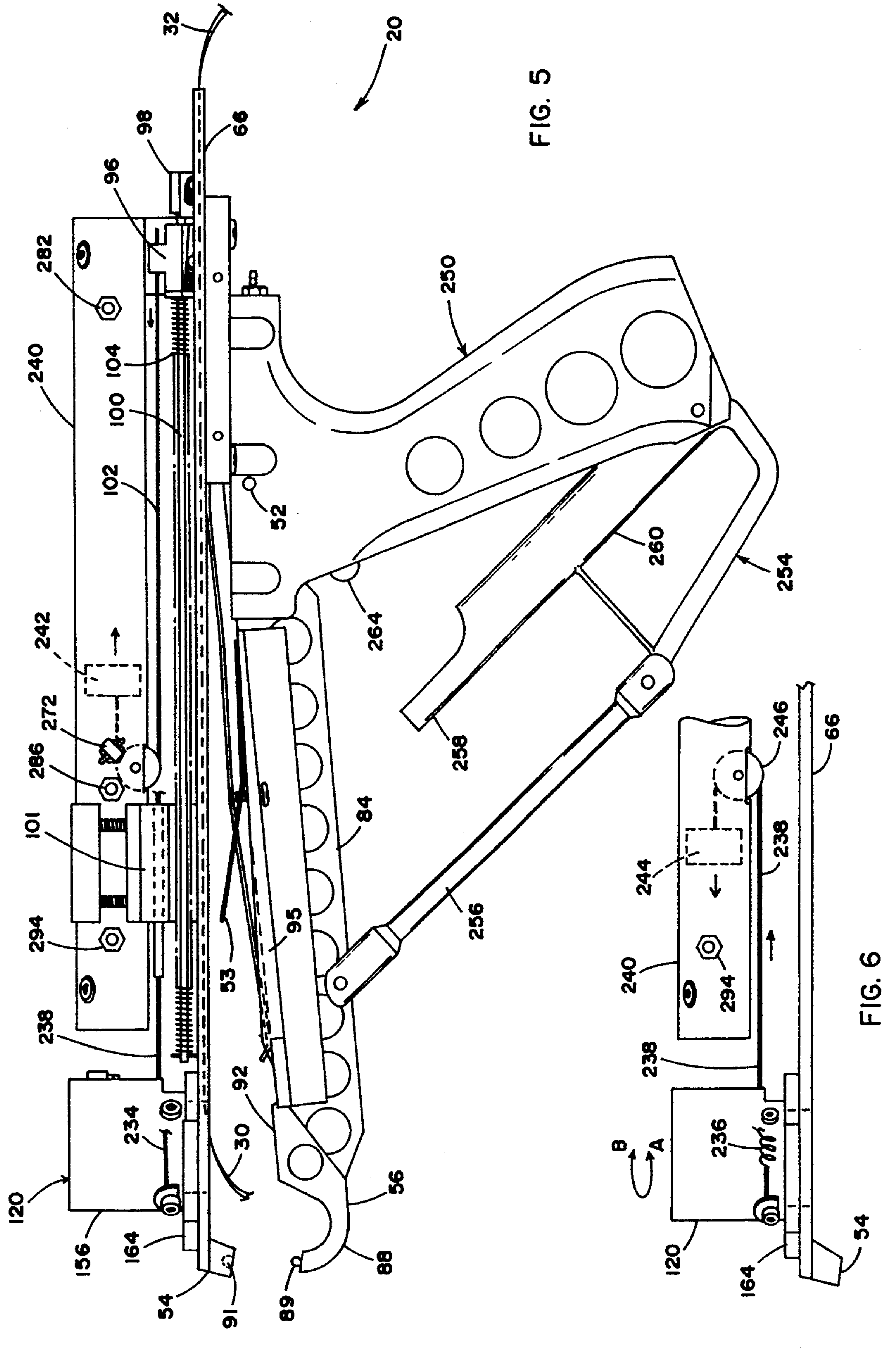
FIG. 5 is the same view as FIG. 4 with the cover and the staple magazine removed.
FIG. 6 is a partially broken-away side view of the stapler head and the stapler-head-actuating mechanism.
Figures 7, 8:
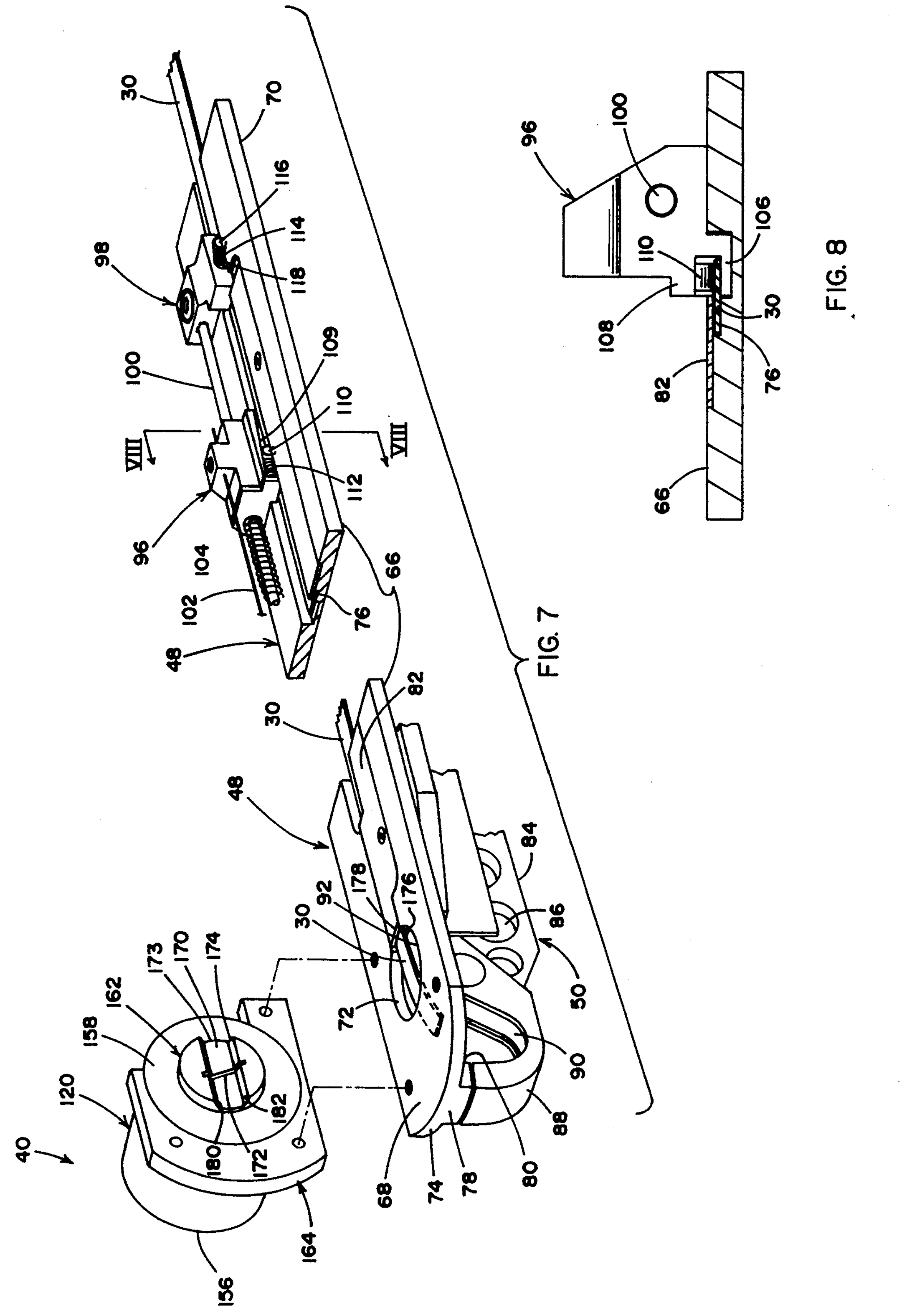
FIG. 7 is a perspective view of the strip material advancing mechanism with the stapler head exploded away.
FIG. 8 is a cross-sectional view taken along the plane VIII—VIII in FIG. 7.

A pair of grippers 96 and 98 (FIG. 7) are operably attached to the top of upper beam 66 near rear end 70. Front gripper 96 is movably mounted on a guide rod 100 that extends between rear gripper 98 and a stand 101 (FIG. 5). A pull cable 102 (FIG. 7) is connected to gripper 96 for pulling gripper 96 forwardly, and a push coil spring 104 is mounted on rod 100 for spring-biasing gripper 96 toward the home position. An elongated "L"-shaped leg 106 extends downwardly from gripper 96 into channel 76 under strip 30 (FIG. 8). An upper elongated leg 108 extends laterally from gripper 96 over L-shaped leg 106, upper leg 108 including a rearwardly angled lower surface that forms a recess 109 having a narrow rear end (FIG. 7). A peg-shaped friction grip 110 is positioned on strip 30 in the recess 109, friction grip 110 being biased toward the narrow rear end of the recess 109 by a spring 112. As cable 102 is pulled, grip 110 binds in the narrow end of the recess causing strip 30 to be drawn forward with gripper 96 following channel 76.

Once strip 30 is fully advanced forwardly, rear gripper 98 holds strip 30 from moving as front gripper 98 is moved back to the home position by spring 104. As front gripper 96 is moved rearwardly, friction grip 110 moves to the larger end of the recess 109 thus allowing friction grip 110 to slide over strip 30 during the rearwardly movement. Rear gripper 98 is securely stationarily mounted to rear en 70 of upper beam 66. Rear gripper 98 includes a recess 114, a peg-like friction grip 116 and a bias spring 118 that function comparably to front gripper components 109, 110 and 112, respectively. The co-action of grippers 96 and 98 allow strip 30 to be advanced a predetermined amount and then held as the strip is stapled to tag 22.

Figure 9:
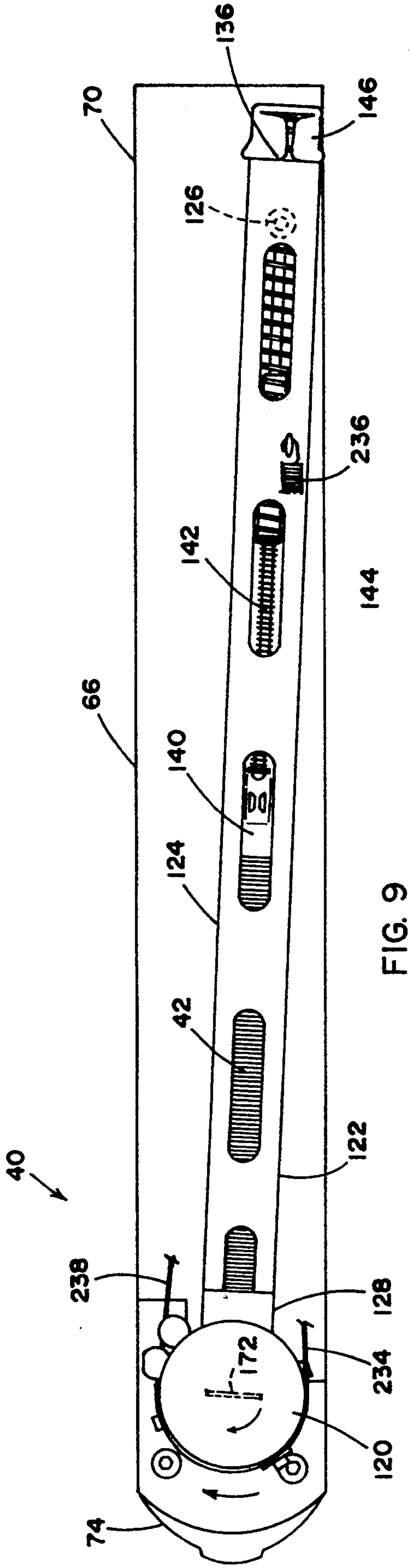
FIG. 9 is a top view of the stapler mechanism and frame, with other components removed, shown in the home position.
Figure 10:
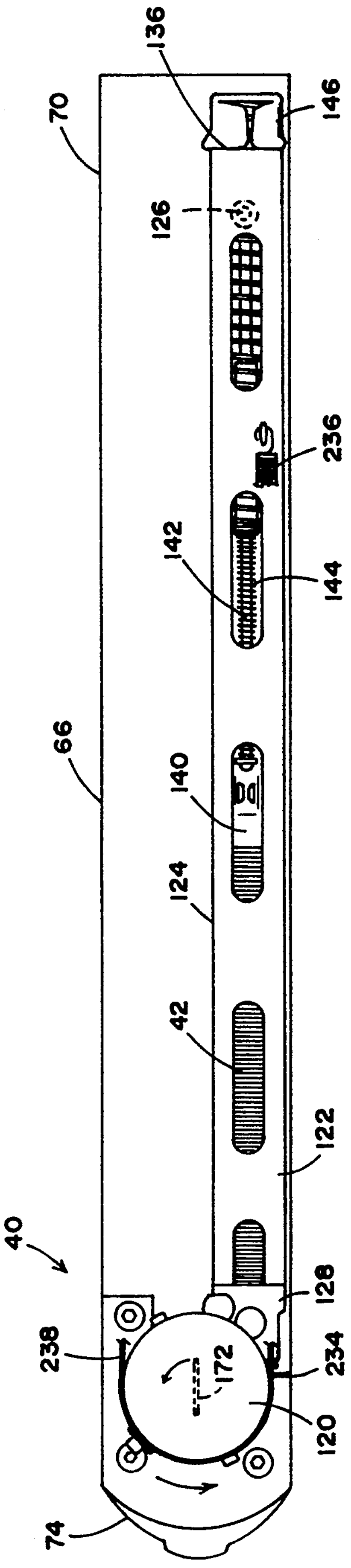
FIG. 10 is the same view as FIG. 9 but with the stapler mechanism rotated to the staple driving position.
Figure 11:
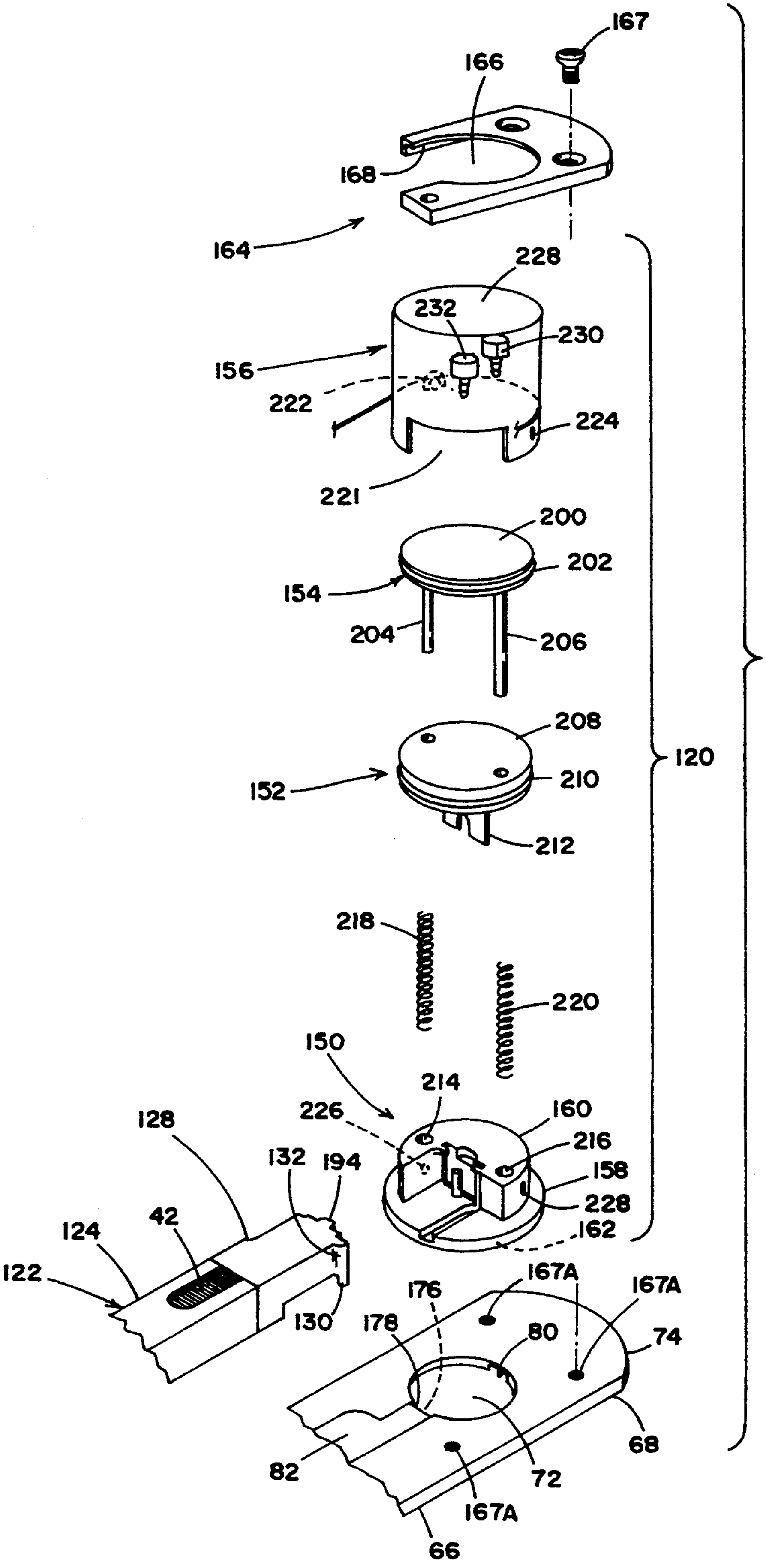
FIG. 11 is an exploded perspective view of the Stapler mechanism including the front of the frame and the mounting bracket for securing the stapler mechanism to the frame front.

Stapler mechanism 40 includes a stapler head 120 (FIGS. 7 and 11) and a stapler magazine 122 filled with staples 42 (FIGS. 9 and 10). Stapler magazine 122 (FIGS. 9 and 10) includes a rectangular tubular sleeve 124 pivotally mounted to the top of upper beam 66 at pivot 126. The front end of magazine 122 includes an adapter 128 with a pivot/ slide pin 130 (FIG. 11) projecting downwardly at the front right corner 132 of adapter 128. Stapler head 120 is rotatably mounted in hole 72. A groove 134 in stapler head 120 operably receives pin 130 so that stapler magazine 122 rotates with stapler head 120 as stapler head 120 is rotated between a home position (FIG. 9) and a stapling position (FIG. 10). Stapler magazine 122 can be loaded from end 136, which mateably receives a plunger 140, a push rod 142, a bias spring 144, and an end plug 146 for managing staples placed therein.

Figure 11A:
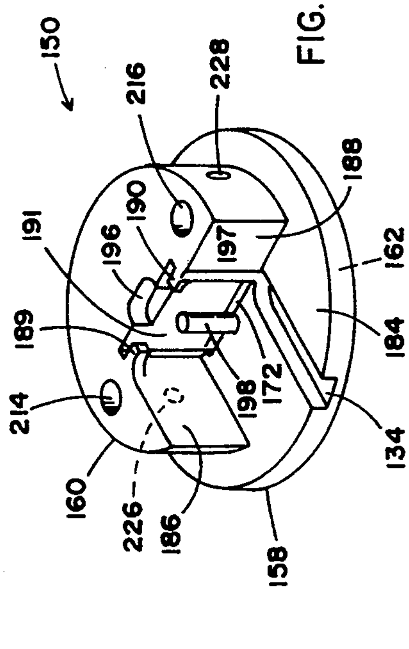
FIG. 11A is an enlarged perspective view of the stapler head base shown in FIG. 11.
Figure 13:
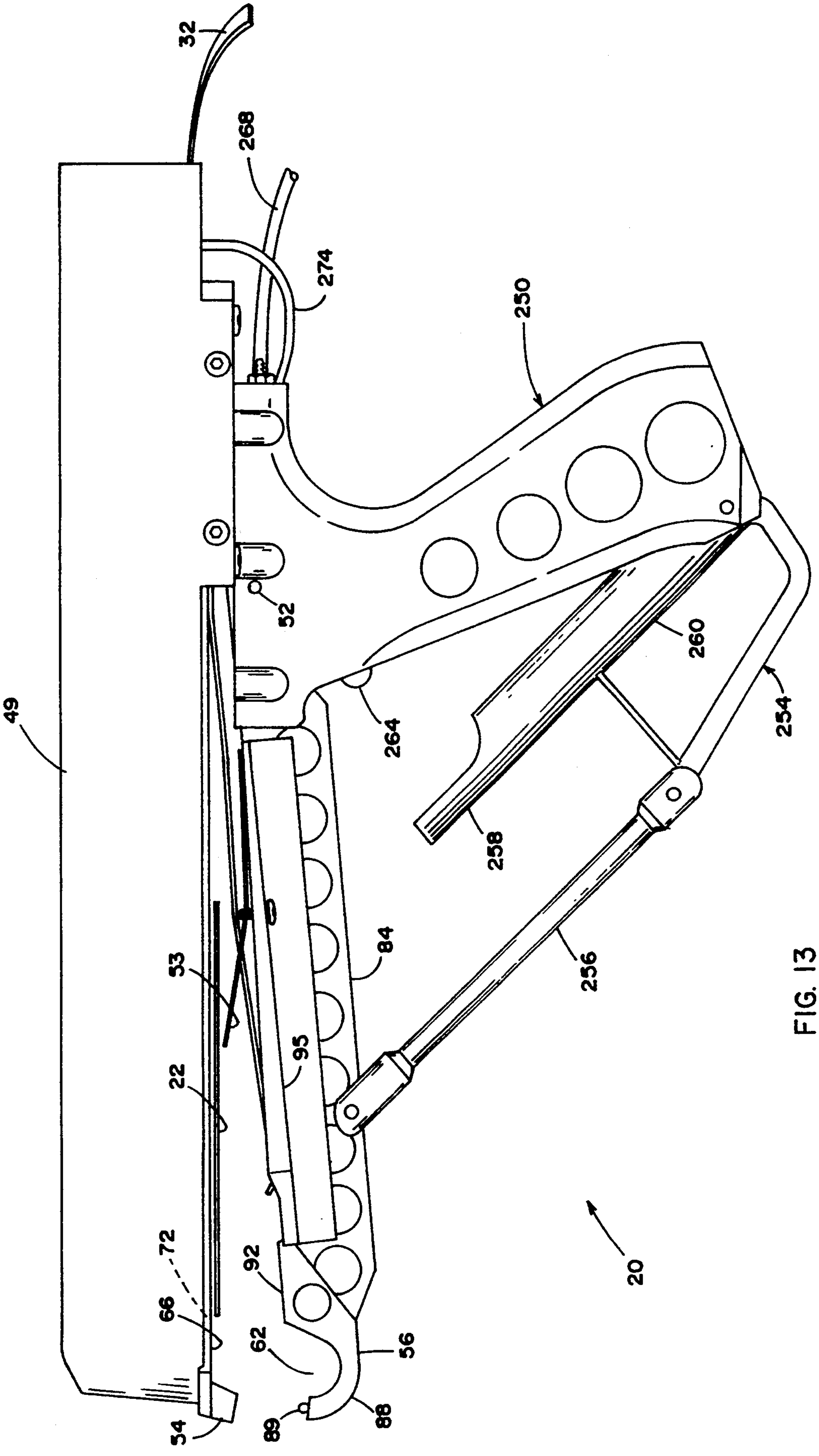
FIG. 13 is a side view of the tagging apparatus in the home position with a tag positioned in the tagging apparatus.
Figure 14:
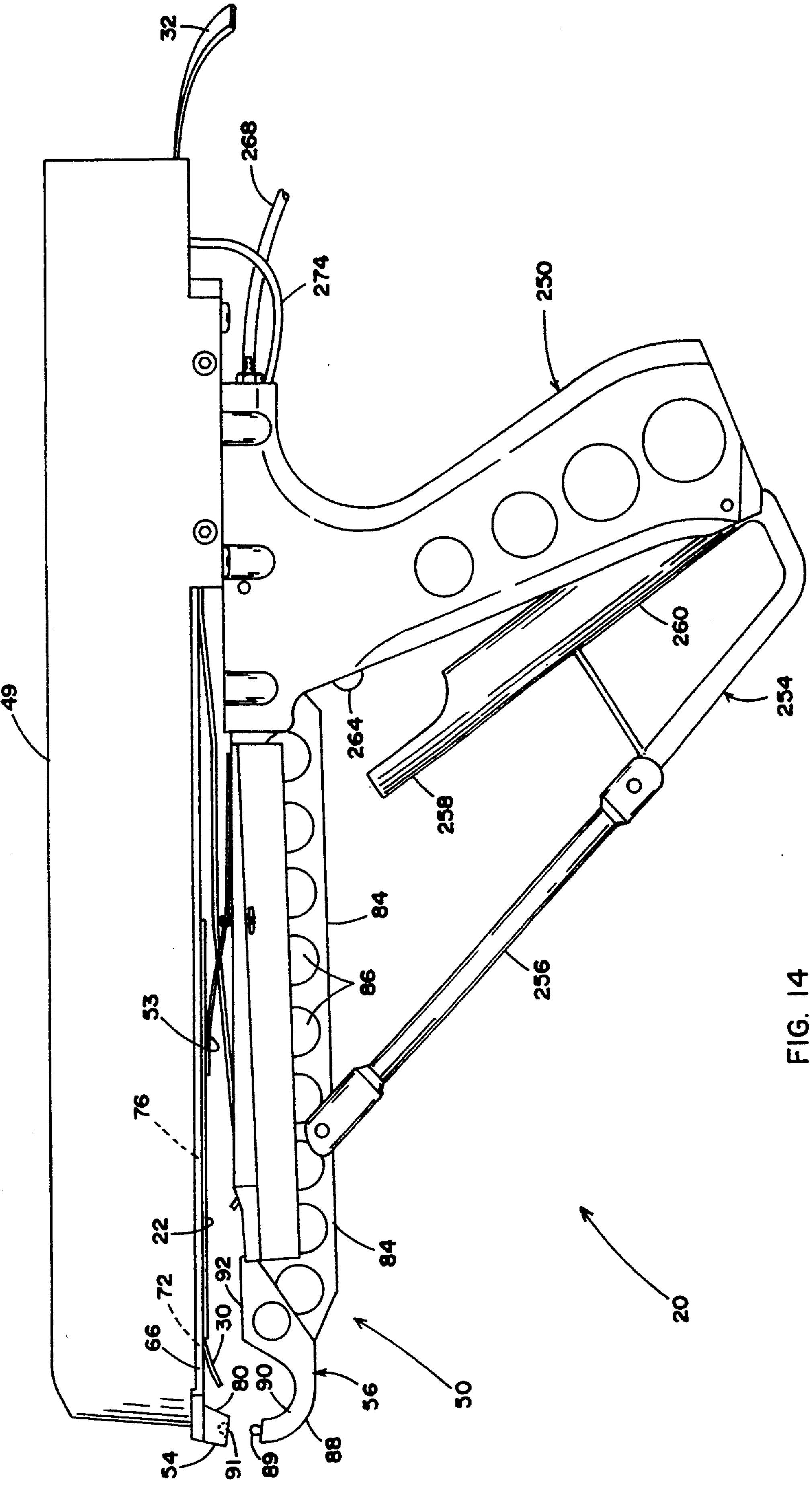
FIG. 14 is a side view of the tagging apparatus with the lower Jaw partially closed and thus holding the tag.

Staler head 120 (FIG. 11) includes a rotatable base 150 to which a staple-driving pneumatically-operated piston 152, a staple-pickup pneumatically-operated piston 154 and a cylinder 156 are operably mounted. In particular, base 150 (FIG. 11A) includes a central disc 158 from which a staple-managing upper die block 160 extends upwardly and a staple guide trip-cutting lower die block 162 (FIG. 7) extends downwardly. A retaining plate 164 (FIG. 11) includes an opening 166 adapted to fit over cylinder 156 (and upper die block 160). The lower surface 168 of retaining plate 164 defines a recess for rotatably receiving the perimeter of disc 158 so that when retaining plate 164 is secured to the front end 68 of upper beam 66, base 150 is rotatably mounted on beam 66 with lower die block 162 extending through hole 72. Screws 167 secure retaining plate 164 to Upper beam 66 by engaging holes 167A in beam 66.

Lower die block 162 (FIG. 7) is generally disc-like in shape. A channel 170 extends transversely across the lower surface of lower die block 162. A staple guide slot 172, extends vertically through stapler head 150. Staple guide slot 172 is centrally located on lower die block 162 and he width of staple guide slot 172 extends across channel 170. The inlet 173 to channel 170 includes a sharpened edge 174 adapted to cut strip 30 as stapler head 120 is rotated with sharp edge 174 cutting against the adjacent surfaces 176 on upper beam 66 and also on the front edge 178 on retainer plate 82. Notably, the sides 180 and 182 of channel 170 are angled so that strip 30 is forced out of channel 170 as stapler head 120 is rotated. This prevents the trailing end 38 of strip 30 from jamming or being carried out of position as stapler head 120 is rotated and strip 30 is cut from roll 32.

Disc 158 (FIG. 11A) includes an upper surface 184 with the grove 134 defined therein. Upper die block 160 extends upwardly at least the height of stapler magazine 122. Upper die block 160 defines perpendicular surfaces 186 and 188. A surface 191 on upper die block 160 defines the rear side of staple guide slot 172. Surface 191 is generally parallel surface 188. Opposing protrusions 189 and 190 extends inwardly toward each other at the top of staple guide slot 172, the rear side of protrusions 189 and 190 forming an upper part of staple-guiding slot 172 with surface 191, and the front side of protrusions 189 and 190 forming a surface generally parallel to surface 188. The end of stapler magazine adapter 128 rests against protrusions 190 and 192 and surfaces 186 and 188 when in the home position (FIG. 9). Adapter 128 further includes a centering protrusion 194 (FIG. 11) that mateably engages recess 196 (FIG. 11A) in upper die block 160 when in the rest position. Also, pivot pin 130 rests in a depression 197 in surface 188 when in the rest position. A staple guide pin 198 extends upwardly from base disc 158 in a position spaced from surface 191 to further define staple guide slot 172.

Staple-pickup piston 154 (FIG. 11) includes a piston section 200 with "O"-ring seal 202 located around its perimeter and further includes two spaced parallel guide rods 204 and 206 extending perpendicular to the face of piston section 200. Staple-driving piston 152 includes a piston section 208 with an "O"-ring seal 210 located around its perimeter and further includes a stapler-driving blade 212 extending perpendicular from piston section 208. Stapler blade 212 is adapted to slidingly fit within staple guide slot 172, and is sufficiently long so that it extends fully through base 150 (i.e. upper die block 160, disc 158, and lower die block 162) when staple-driving piston 152 is pressed against the top of upper die block 160.

Upper die block 160 is configured with a pair of spaced holes 214 and 216 adapted to slidingly receive guide rods 204 and 206. A pair of coil springs 218 and 220 are positioned on guide rods 204 and 206 respectively with springs 218 being located partially in upper die block holes 214 and 216 and between disc 158 and staple-driving piston 152.

Stapler head cylinder 156 (FIG. 11) is configured to retain pistons 152 and 154 to base 150. The lower end of cylinder 156 includes a notch 221 shaped to operably receive stapler magazine adapter 128. Notch 221 is enlarged so that magazine adapter 128 can operably move between the home position (FIG. 9) and the stapling position (FIG. 10). A pair of holes 222 and 224 are drilled in cylinder 156 along the lower edge of cylinder 156, holes 222 and 224 aligning with corresponding holes 226 and 228 in upper die block 160 to permit secure attachment to base 150 by screws (not shown).

The upper end of cylinder 156 is closed by an end panel 228. A pair of compressed air inlets 230 and 232 are positioned in the sidewall of cylinder 156. The upper air inlet 230 is positioned near end panel 228 so that when compressed air is introduced, the compressed air drives staple-pickup piston 154 downwardly until guide rods 204 and 206 bottom-out in holes 214 and 216 in upper die block 160. The lower air inlet 232 is positioned so that when compressed air is introduced with piston 154 driven fully down, air is introduced between piston 152 and 154 such that staple-driving piston 152 is driven downwardly until piston 52 engages upper die block 160. When the compressed air is vented, springs 218 and 220 bias pistons 152 and 154 upwardly to the home position.

A pull cable 234 (FIG. 12) is attached to stapler head 120 such as at the screw in hole 222. Pull cable 234 is attached to a spring 236 that in turn is attached to a stable place such as staple magazine sleeve 124. Pull cable 234 and spring 236 rotatingly bias stapler head 120 to the home position in direction A. (See also FIGS. 6 and 9. ) A second pull cable 238 extends around cylinder 156 in a direction opposite pull cable 234. Second pull cable 238 is adapted to rotate stapler head 120 to the stapling position when pulled.

The actuating and powering mechanism for tagging apparatus 20 (FIG. 12) includes a tubular cylinder 240, and a pair of independent pistons 242 and 244 operably mounted in cylinder 240. Piston 242 is the strip-advancing piston, and piston 244 is the stapler-head-rotating piston. A rotatable pulley 246 is operably mounted in the sidewall of cylinder 240 about one-third of the way along cylinder 240. The top of pulley 246 lies proximate the center of tubular cylinder 240 and the bottom of pulley 246 lies outside of the sidewall of tubular cylinder 240. Actuating cable 102 of strip gripper 96 extends around pulley 246 and connects to piston 242. Actuating cable 238 of stapler head 120 extends around pulley 246 and connects to piston 244. Pulley 246 is made so that it permits cables 102 and 238 to slide over pulley 246, thus allowing a single common pulley 246 to be used. Alternatively, it is contemplated that separate pulleys could be used for each cable.

Figure 4:
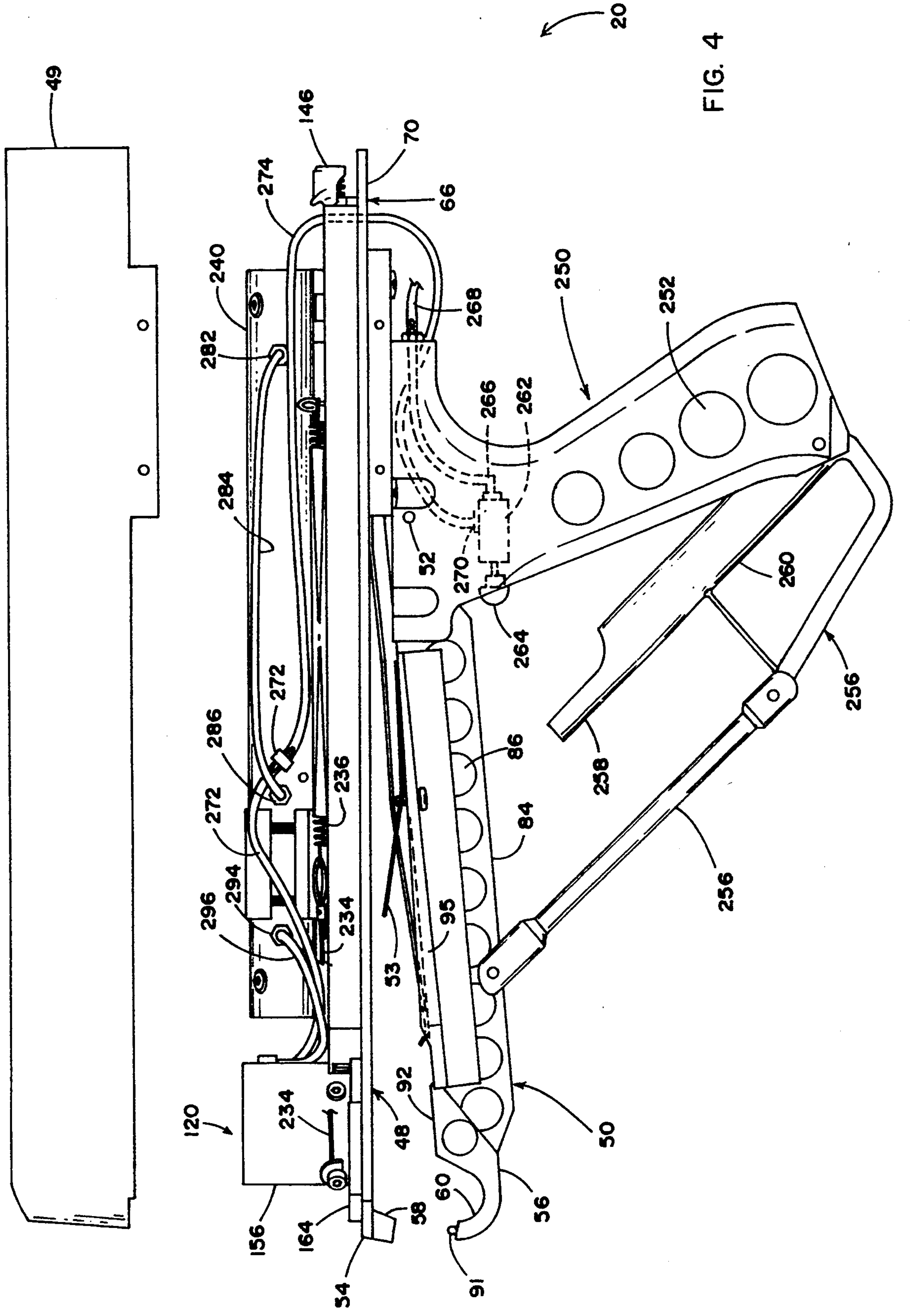
FIG. 4 is a side view of the tagging apparatus shown in FIG. 1 with the cover exploded away.

A handle 250 (FIG. 4) is mounted to the bottom of rear end 70 of upper beam 66. Handle 250 forms a piston-like grip readily adapted for grasping by a person's hand. Holes 252 are cut into handle 250 as desired to reduce weight. A trigger 254 is pivotally attached to the bottom of handle 250. A link 256 operably connects trigger 254 to lower member 50 so that as trigger 254 is partially squeezed (FIG. 14), lower member 50 is pressed against upper frame member 48. A protrusion 258 extends upwardly from the finger-receiving portion 260 of trigger 254. A push-operated valve 262 is mounted in handle 250 so that as trigger 254 reaches the fully depressed "firing" position (FIG. 15), protrusion 258 engages plunger 264 on valve 262 to open valve 262 (FIG. 4).

The actuating mechanism of tagging apparatus 20 is interconnected to the components of tagging apparatus 20 in the following manner. Compressed air tank 28 (FIG. 12) is connected to the air inlet 266 on valve 262 by a tube 268. The air outlet 270 of valve 262 is connected to a "T" connector 272 on tubular cylinder 240 by a tube 274. Air is communicated from T connector 272 to an enclosed area 276 in cylinder 240 by passageway 278 that extends through wall 280. Enclosed area 276 is bounded on one end by strip-advancing piston 242 and at the other end by wall 280. A tube 281 also communicates air from T connector 272 to air inlet 230 on stapler head cylinder 156 to thus drive piston (154) downwardly to select or "pick" a staple. The selected staple is shoved partially into staple-guiding slot 172 (FIG. 11A) where the staple is located between staple guide pin 198 and surface 191. The selected staple is held in that position as stapler head 120 is rotated as described below.

Figure 12:
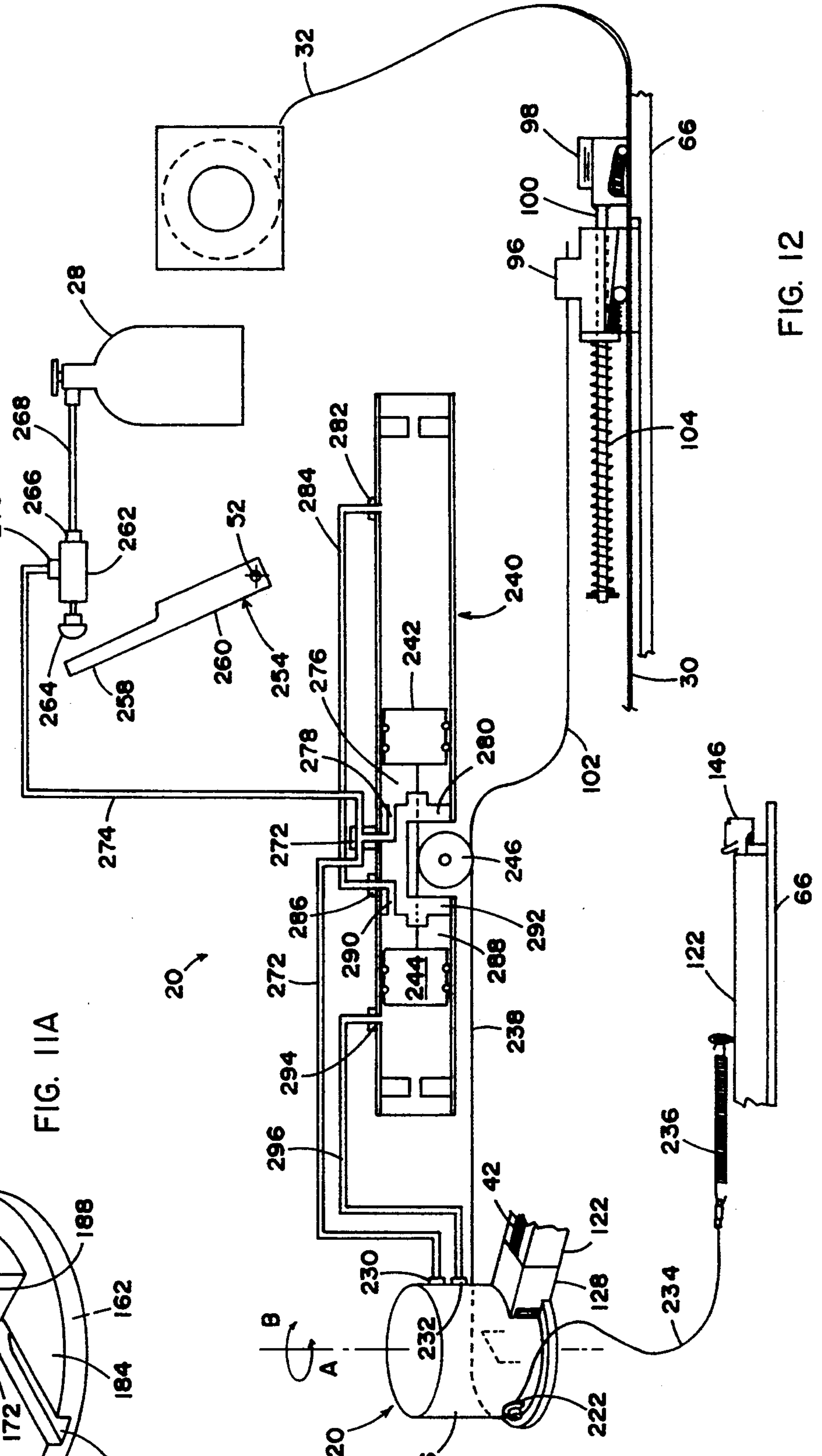
FIG. 12 is a schematic diagram, illustrating the actuating mechanism for the strip advancing system and the stapling mechanism, and also the sequencing method therefor.

As piston 242 is moved to a fully advanced position, piston 242 passes an air outlet 282 in cylinder 240 (FIG. 12). A tube 284 communicates air from air outlet 282 to air inlet 286 also in cylinder 240. Air is communicated from air inlet 286 to an enclosed area 288 in cylinder 240 by passageway 290 that extends through wall 292. Enclosed area 288 is bounded on one end by stapler-head-rotating piston 244 and at the other end by wall 292. As stapler-head-rotating piston 244 is moved to a fully advanced position, piston 244 passes an air outlet 294 in cylinder 240. A tube 296 communicates air from air outlet 294 to air inlet 232 on stapler head cylinder 156, thus actuating stapler-driving piston 152 to drive the selected staple through strip ends 36 and 38 and tag 22. The actuating systems remains at this position until trigger 254 is released and valve 262 is closed. At such time, valve 262 is vented and pistons 292 and 244 are returned to the home position by springs 118 and 236, respectively (FIG. 12) and pistons 242 and 244 are returned to the home positions by springs 104 and 236.

The present embodiment is pneumatically powered, although it is specifically contemplated that other means such as a battery powered or even a gas powered system are within the scope of this invention.

Thus, a tagging apparatus for efficiently and automatically extending a flexible strip around a branch or stem, and for automatically securing a tag to the strip and in turn to the branch/stem is provided. Optimally the tagging apparatus is a pneumatically powered hand-held unit adapted to hold and staple an identification tag to the branch/stem by use of a looped flexible strip.

In the foregoing description, it will be readily appreciated by persons skilled in the art that modifications may be made to the invention without departing from the concepts disclosed herein. Such modifications are to be considered as included in the following claims, unless these claims by their language expressly state otherwise. The scope of the invention is intended to be limited only by the scope of the appended claims as interpreted according to the principles of patent law including the Doctrine of Equivalents.

The embodiments of the invention in which an exclusive property or privilege is claimed are defined as follows:

1. An apparatus for attaching a flexible strip to plants, comprising:

a frame member including a curvilinear surface adapted to receive a plant stem or branch and advance the flexible strip to form a loop around the plant stem or branch;

an advancing mechanism attached to said frame member for advancing the flexible strip of material slideably along a guiding channel formed in said curvilinear surface, said curvilinear surface being shaped to direct a leading end of the strip around the plant stem or branch and back onto a trailing portion of the strip to thus form a loop around the plant stem or branch as the strip is advanced so that the leading end and the trailing portion are positioned proximate each other; and means attached to said frame member for securing the leading end and the trailing portion of the flexible strip together.

2. The apparatus as defined in claim 1 wherein said means for securing includes stapling means for mechanically securing the leading end and the trailing portion together.

3. The tagging apparatus as defined in claim 1 wherein said frame member includes a first jaw and a second jaw movable relative said first jaw, said first and second jaws being movable to a closed position and including first and second surfaces defining said curvilinear surface when in said closed position.

4. The apparatus as defined in claim 1 including a portable energy source and powering means connected to said energy source for powering said securing means.

5. The apparatus as defined in claim 1 including cutting means for cutting the strip from a roll of supply stock after the strip has been advanced.

6. The apparatus as defined in claim 1 including a tag holder for holding a tag and further including a stapler operably mounted to said frame member and being actuatable to staple the leading end, the trailing portion and the tag together.

7. The tagging apparatus for attaching tags to plants, comprising:

a frame including jaws defining surfaces adapted to receive and partially enclose a plant stem or branch and for advancing a flexible strip to form a loop;

an advancing mechanism for advancing the flexible strip of material slideably along a guiding channel formed in said surfaces;

a tag holder for holding a tag near the strip; and a stapler operably mounted to said frame, said stapler being actuatable to staple a leading end and a trailing portion of the strip and the tag together, said stapler including a magazine for staples, and means for rotationally positioning a selected one of the staples longitudinally inline with the strip before stapling so that the selected staple engages the leading end, the trailing portion and the tag after being stapled.

8. The apparatus as defined in claim 1 wherein said securing means and said advancing mechanism are operably connected so that, upon actuating said securing means, said advancing mechanism and said securing means operate sequentially to first advance the strip and then secure the strip to a tag.

9. The apparatus as defined in claim 8 including a cutting means for cutting the strip from a roll of supply stock after the strip has been advanced.

10. A tagging apparatus for attaching tags to plants, comprising:

a frame member including a curvilinear surface adapted to receive a plant stem or branch and advance a flexible strip to form a loop around the stem or branch;

an advancing mechanism attached to said frame member for advancing the flexible strip of material slideably along a guiding channel formed in said curvilinear surface, said curvilinear surface being shaped to direct a leading end of the strip around the plant stem or branch and back onto a trailing portion of the strip to thus form a loop around the plant stem or branch as the strip is advanced so that the leading end and the trailing portion are positioned proximate each other;

securing means attached to said frame member for securing the leading end and the trailing portion together; and holding means attached to said frame member for releasably holding a tag proximate the plant stem or branch, said securing means also being adapted to secure the tag to both the leading end and the trailing portion.

11. The tagging apparatus as defined in claim 10 wherein said frame member includes a first jaw and a second jaw movable relative said first jaw, said first and second jaws including said surface.

12. The tagging apparatus as defined in claim 11 wherein said frame member includes a handle adapting said tagging apparatus for hand-held use.

13. The tagging apparatus as defines in claim 12 including a portable energy source and powering means, connected to said energy source and said securing means, for powering said securing means.

14. An apparatus to facilitate attaching tags to plants, comprising:

a frame member including a curvilinear surface adapted to receive a plant stem or branch and advance a flexible strip to form a loop around the stem or branch;

an advancing mechanism attached to said frame member for advancing the flexible strip of material slideably along a guiding channel formed in said curvilinear surface, said curvilinear surface being shaped to direct a leading end of the strip around the plant stem or branch and back onto a trailing portion of the strip to thus form a loop around the plant stem or branch as the strip is advanced so that the leading end and the trailing portion are positioned proximate each other; and a spring biased holder operably connected to said frame member for releasably holding a tag proximate the plant stem or branch while said advancing mechanism is advancing the strip.

15. A tagging apparatus for attaching tags to plants, comprising:

a frame member including a curvilinear surface adapted to receive a plant stem or branch and advance a flexible strip to form a loop around the plant stem or branch;

an advancing mechanism attached to said frame member for advancing the flexible strip of material slideably along a guiding channel formed in said curvilinear surface, said curvilinear surface being shaped to direct a leading end of the strip around the plant stem or branch and back onto a trailing portion of the strip to thus form a loop around the plant stem or branch as the strip is advanced so that the leading end and the trailing portion are positioned proximate each other; and cutting means for cutting the strip from a roll of supply stock after the strip has been advanced, said cutting means including a rotatable die having a cutting edge thereon.

16. An apparatus for attaching tags to plants comprising:

a frame member;

a tag holder operably connected to said frame member for holding a tag;

a surface on said frame member adapted to receive a plant stem or branch, said surface defining a channel for advancing a flexible strip to form a loop around the plant stem or branch;

advancing means for advancing the strip of flexible material slideably along said channel in said surface so that said surface directs an end of the strip of flexible material in a loop around the plant stem or branch; and securing means for securing the strip of flexible material to the tag to retain the tag to the stem.

17. A tagging apparatus for attaching tags to plants comprising:

a frame member;

holding means operably connected to said frame member for holding a tag;

a curvilinear surface on said frame member adapted to receive a plant stem or branch for advancing a flexible strip to form a loop around the plant stem or branch;

advancing means for advancing the strip of flexible material slideably along a guiding channel formed in said surface so that said surface direct the strip of flexible material in a loop around the plant stem or branch;

securing means for securing the strip of flexible material to the tag to retain the tag to the stem; and a portable energy source and powering means connected to said energy source for powering said securing means.

18. A tagging apparatus for attaching tags to plants comprising:

a frame member;

holding means operably connected to said frame member for holding a tag;

a curvilinear surface on said frame member adapted to receive a plant stem or branch for advancing a flexible strip to form a loop around the plant stem or branch;

an advancing mechanism for advancing the strip of flexible material slideably along a guiding channel formed in said surface so that said surface direct the strip of flexible material in a loop around the plant stem or branch;

securing means for securing the strip of flexible material to the tag to retain the tag to the stem; and stapling means for mechanically securing a leading end and a trailing of the strip portion together.

19. The tagging apparatus as defined in claim 18 wherein said stapler means includes a magazine for staples, and further includes means for rotationally positioning a selected one of the staples longitudinally in-line with the strip before strip before stapling so that the selected staple engages said leading end, said trailing portion and the tag after being stapled.

20. A tagging apparatus for attaching tags to plants comprising:

a frame member;

holding means operably connected to said frame member for holding a tag;

a curvilinear surface on said frame member adapted to receive a plant stem or branch for advancing a flexible strip to form a loop around the plant stem or branch;

advancing means for advancing the strip of flexible material slideably along a guiding channel formed in said surface so that said surface direct the strip of flexible material in a loop around the plant stem or branch;

securing means for securing the strip of flexible material to the tag to retain the tag to the stem; and said securing means including cutting means for cutting the strip from a roll of supply stock after the strip has been advanced.

21. A tagging apparatus for attaching tags to plants comprising:

a frame member including a first jaw and a second jaw movable relative to said first jaw;

holding means operably connected to said frame member for holding a tag;

a curvilinear surface formed on said first and second jaws said frame member adapted to receive a plant stem or branch for advancing a flexible strip to form a loop around the plant stem or branch;

advancing means for advancing the strip of flexible material slideably along a guiding channel formed in said surface so that said surface direct the strip of flexible material in a loop around the plant stem or branch; and securing means for securing the strip of flexible material to the tag to retain the tag to the stem.

22. An apparatus for tagging plants comprising:

a frame including jaws having surfaces for advancing a flexible strip to form a loop;

first spring biased means for holding a tag in a predetermined position;

second means for advancing the strip slideably along a guiding channel formed in said surfaces into a loop around a plant stem or branch;

third means for holding a leading end of the strip proximate a trailing end of the strip, and for holding the leading end and the trailing end proximate the tag; and fourth means for securing the leading end, the trailing end, and the tag together, said first, second, third and fourth means being operably attached to said frame.

23. The apparatus as defined in claim 22 including a handle attached to said frame adapting said tagging apparatus for hand-held use.

24. The apparatus as defined in claim 23 including a trigger, said trigger being movable between an open position, an intermediate position, and a closed position, said first means being operably connected to said first means so that the tag is held when said trigger is in said intermediate position, and further including a means for actuating said second and fourth means when said trigger is in said closed position.

25. A tagging apparatus comprising:

a first frame member including a first jaw;

a second member including a second jaw, said second member being movably connected to said first frame member so that said second jaw can move between an open position and a closed position relative to said first jaw, said first and second jaws including opposing concave surfaces defining a guiding channel for advancing a flexible strip to form a loop when in the closed position so that said first and second jaws can be closed around a plant branch with the plant branch positioned in the loop;

means for advancing a strip of material slideably along said opposing concave surfaces when int he closed position so that the strip of material extends around the concave surfaces to form a loop;

a spring biased tag holder attached to said first frame member;

a mechanical fastening mechanism connected to said first frame member, said mechanical fastening mechanism being actuatable to join a tag to the strip and to join portions of the strip to form a permanent loop around the plant branch; and means for actuating said mechanical fastening mechanism.

26. An apparatus for attaching a strip of flexible material to plants comprising:

a frame member including curvilinear surfaces for advancing the strip of flexible material to form a loop;

means for advancing the strip of flexible material slideably along a guiding channel formed in said surfaces so that the strip of flexible material forms a loop around the plant stem or branch; and a rotatably stapler mechanism having a stapler head rotatably mounted to said frame member, said stapler head including a rotatable cutting means for cutting the strip from a roll of flexible material and further including means for stapling the strip of flexible material to a tag to retain the tag to the stem.

* * * * *

UNITED STATES PATENT AND TRADEMARK OFFICE
CERTIFICATE OF CORRECTION

PATENT NO. : 5,339,517
DATED : August 23, 1994
INVENTOR(S) : Gordon J. Diemer

It is certified that error appears in the above-indentified patent and that said Letters Patent is hereby corrected as shown below:

Column 4, line 19;
"team" should be --beam--.

Column 5, line 2;
"en" should be --end--.

Column 5, line 26;
"Staler" should be --Stapler--.

Column 5, line 32;
"trip-cutting" should be --strip-cutting--.

Column 6, line 57;
"52" should be --152--.

Column 8, claim 3, line 54;
Delete "tagging".

Column 11, claim 18, line 21;
"and a trailing of the strip portion together." should be --and a trailing portion of the strip together.--

UNITED STATES PATENT AND TRADEMARK OFFICE

CERTIFICATE OF CORRECTION

PATENT NO. : 5,339,517

DATED : August 23, 1994

INVENTOR(S) : Gordon J. Diemer

It is certified that error appears in the above-indentified patent and that said Letters Patent is hereby corrected as shown below:

Column 12, claim 25, line 39; "int he" should be --in the--.

Signed and Sealed this

Fourteenth Day of March, 1995

Attest:

BRUCE LEHMAN

*Attesting Officer*

*Commissioner of Patents and Trademarks*